Patented June 13, 1939

2,162,206

UNITED STATES PATENT OFFICE 2,162,206

COMPOUNDS OF THE PYRAZOLANTHRONE SERIES

Earl E. Beard, Wilmington, Del., assignor to E. I. du Pont de Nemours & Company, Wilmington, Del., a corporation of Delaware No Drawing. Original application February 24, 1936, Serial No. 65,421. Divided and this application November 16, 1938, Serial No. 240,647

3 Claims. (Cl. 260—312)

This invention relates to the preparation of new compounds of the pyrazolanthrone series and more particularly to the preparation of pyrazolanthrone compounds containing aldehyde groups in the 6-position, and dyestuffs obtainable therefrom. This application is a division of my co-pending application Serial No. 65,421, filed February 24, 1936.

I have found that new and valuable dyestuff intermediates may be produced from 1-amino-anthraquinone-6-aldehyde by converting the same to the 1-hydrazino-anthraquinone-6-aldehyde, which in turn may be ring-closed to the corresponding pyrazolanthrone.

The 1-amino-anthraquinone-6-aldehyde may be prepared by the reduction of 1-nitro-anthraquinone-6-aldehyde described by Eckert in Monatshefte für Chemie, 1914, p. 189, with alkaline hydrosulfite or sulfhydrate. The diazotization of the 1-amino-anthraquinone-6-aldehyde and its reduction to the corresponding hydrazine is carried out by the method usually employed for the preparation of hydrazine compounds of the anthraquinone series from alpha-amino-anthraquinone. The ring-closure of the hydrazine to the pyrazolanthrone is preferably carried out in concentrated sulfuric acid from which the pyrazolanthrone can be separated on dilution from any impurities that may be formed. Other acids, such as glacial acetic acid, may of course be used to effect this ring-closure, in accordance with the process described in the prior art.

In the mononitration of anthraquinone-beta-aldehyde there is usually obtained a mixture of 1-nitro-anthraquinone-6-aldehyde and 1-nitro-anthraquinone-7-aldehyde. The 1-nitro-anthraquinone-6-aldehyde may be separated from the mixture by means of glacial acetic acid. The 1,7 isomer is dissolved in this particular solvent and may be recovered from the glacial acetic acid filtrate. The originally obtained mixture may be reduced to the corresponding amines, diazotized, and converted to the mixed hydrazines, and this material may in turn be subjected to the acid ring-closure. The resulting pyrazolanthrone is, however, in the main the 1,9-pyrazolanthrone-6-aldehyde since in the reduction process and the subsequent acid conversion to the pyrazolanthrone substantially all of the 7 isomer is eliminated.

The pyrazolanthrone-6-aldehyde may be converted to valuable red dyestuffs by treating with alcoholic alkalies in the manner usually employed in the formation of dipyrazolanthrone compounds, and then alkylating the dipyrazolanthrones to form the N-dimethyl or N-diethyl dipyrazolanthrone-6,6'-dialdehydes.

The following examples are given to more fully illustrate my invention. The parts used are by weight.

Example 1

Ten parts of the 1-hydrazino-anthraquinone-6-aldehyde, prepared by diazotization and reduction of 1-NH$_2$-anthraquinone-6-aldehyde, are dissolved in eighty parts of 93% H$_2$SO$_4$ and heated at 120–130° C. for from 4 to 5 hours. The mass is then diluted with water and filtered. An excellent yield of 1,9-pyrazolanthrone-6-aldehyde is obtained. It is a dark greenish yellow powder which dissolves in concentrated sulfuric acid with a yellow color with green fluorescence.

Example 2

Ten parts of 1,9-pyrazolanthrone-6-aldehyde (prepared according to Example 1) are ground fine and added to a melt of forty parts methyl alcohol and forty parts potassium hydroxide at a temperature of 100–110° C. The mass is heated to 135–145 C. and held at this temperature for from 5 to 7 hours. The fusion mass is then drowned in sufficient water to bring the alkali concentration to about 8%, oxidized with air and filtered. The product obtained is the potassium salt of the dipyrazolanthrone-6,6'-dialdehyde.

Example 3

To a suspension of ten parts of the dipyrazolanthrone-6,6'-dialdehyde (prepared according to Example 2) in a mixture of seventy parts nitrobenzene and 8.5 parts sodium carbonate at 180–185° C. are added, over a period of from 2 to 3 hours, 8.5 parts of diethyl sulfate, dissolved in twenty parts of nitrobenzene. The temperature is maintained for an additional 4 hours after which the charge is cooled to about 50° C. and filtered. The dyestuff cake is washed with nitrobenzene, alcohol and hot water in turns and then dried. The product obtained dyes cotton in red shades from a greenish blue alkaline hydrosulfite vat. It is a red-orange powder which dissolves in concentrated sulfuric acid with an orange color.

Dimethyl sulfate may be used in place of the diethyl sulfate to give the corresponding N-N'-dimethyl - dipyrazolanthrone - 6,6' - dialdehyde. Ethylparatoluenesulfonates or other higher alkyl p-toluene sulfonates may of course be employed in the alkylation of these new dipyrazolanthrone dialdehydes.

I claim:

1. A dipyrazolanthrone-6,6'-dialdehyde.
2. An N-N'-dialkyl-dipyrazolanthrone-6,6'-dialdehyde.
3. N-N'-diethyl - dipyrazolanthrone - 6,6' - dialdehyde.

EARL E. BEARD.

CERTIFICATE OF CORRECTION.

Patent No. 2,162,206. June 13, 1939.

EARL E. BEARD.

It is hereby certified that error appears in the printed specification of the above numbered patent requiring correction as follows: Page 1, first column, line 18, for "p. 189" read p. 289; and that the said Letters Patent should be read with this correction therein that the same may conform to the record of the case in the Patent Office.

Signed and sealed this 18th day of July, A. D. 1939.

(Seal)

Henry Van Arsdale,
Acting Commissioner of Patents.